(12) United States Patent
Matsui

(10) Patent No.: US 8,406,588 B2
(45) Date of Patent: Mar. 26, 2013

(54) OPTICAL CONNECTOR AND METHOD OF CONNECTING FIBER ARRAY

(75) Inventor: Jun Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 217 days.

(21) Appl. No.: 13/072,901

(22) Filed: Mar. 28, 2011

(65) Prior Publication Data

US 2011/0243504 A1 Oct. 6, 2011

(30) Foreign Application Priority Data

Mar. 31, 2010 (JP) .................................. 2010-83263

(51) Int. Cl.
*G02B 6/26* (2006.01)
*G02B 6/32* (2006.01)
*G02B 6/38* (2006.01)
(52) U.S. Cl. ................ 385/51; 385/33; 385/50; 385/52; 385/74
(58) Field of Classification Search ............ 385/33, 385/50, 51, 52, 53, 55, 56, 70–75; 156/293
See application file for complete search history.

(56) References Cited

FOREIGN PATENT DOCUMENTS

| EP | 1 816 497 | 8/2007 |
|---|---|---|
| JP | 2001-215364 | 8/2001 |
| JP | 2006-145787 | 6/2006 |

*Primary Examiner* — Uyen Chau N Le
*Assistant Examiner* — Michael Mooney
(74) *Attorney, Agent, or Firm* — Fujitsu Patent Center

(57) ABSTRACT

An optical connector includes a fiber-support block configured to couple cores of a plurality of optical fibers, and a lens-support block including a contact surface provided with a plurality of openings, the contact surface contacted to a contact surface of the fiber-support block, the cores of the optical fibers projecting from the contact surface of the fiber-support block insertable into the respective openings, the lens-support block having pairs of collimate lenses and convex lenses in the respective openings, each of the collimate lenses and a corresponding one of the convex lenses being spaced apart from each other in an optical-axis direction, the collimate lenses being movable in the optical-axis direction and being pressed by elastically deformable members, respectively, in the optical-axis direction and toward the contact surface of the fiber-support block.

9 Claims, 6 Drawing Sheets

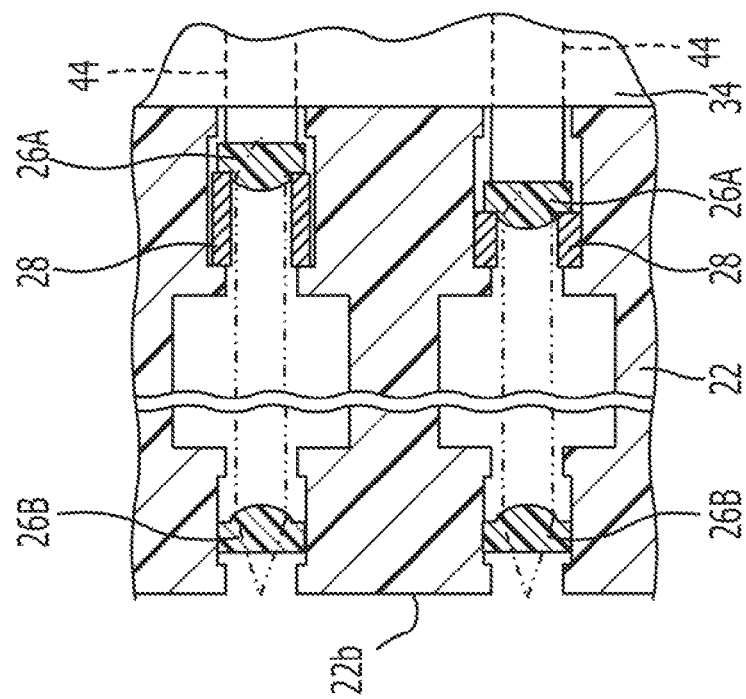
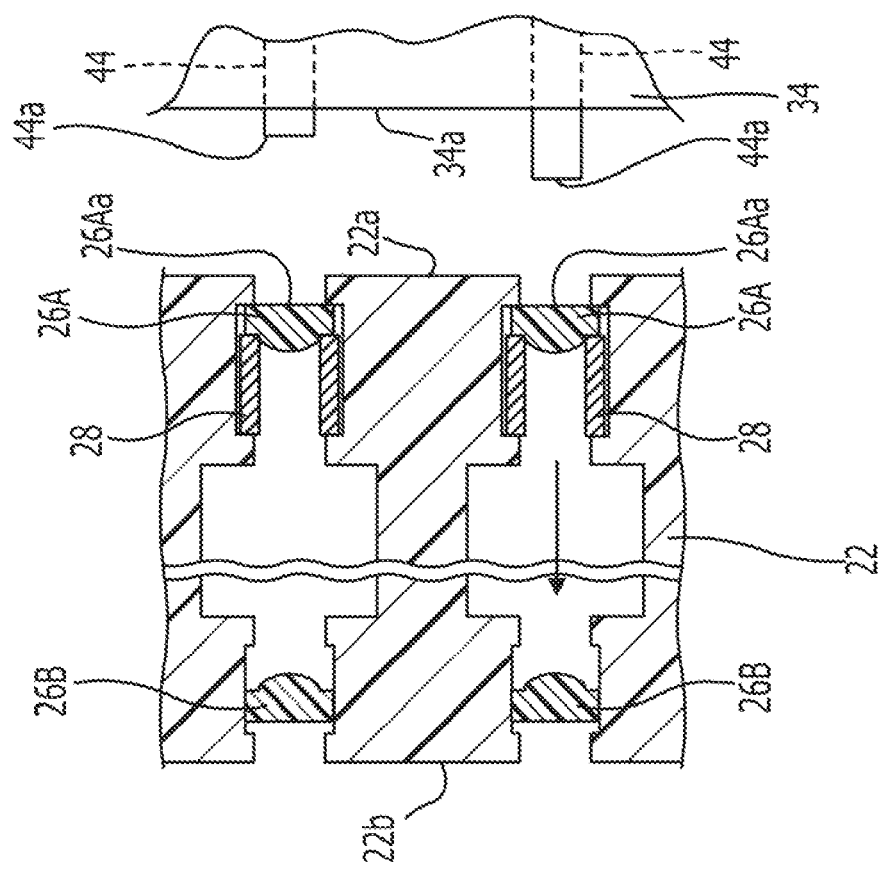
FIG. 4A
FIG. 4B

OPTICAL CONNECTOR AND METHOD OF CONNECTING FIBER ARRAY

CROSS-REFERENCE TO RELATED APPLICATIONS

This application is based upon and claims the benefit of priority of the prior Japanese Patent Application No. 2010-83263, filed on Mar. 31, 2010, the entire contents of which are incorporated herein by reference.

FIELD

Embodiments relate to an optical connector for connecting optical fibers.

BACKGROUND

In the field of optical communications, the necessity of parallel processing of a plurality of optical signals has been increasing with increasing channel capacity. Accordingly, the use of a plurality of optical fibers or opto-functional devices in the form of an array has been spreading. In particular, a fiber sheet in which an array of optical fibers is closely provided has recently been employed in many cases.

To reduce the coupling loss in optical transmission, optical fibers may be connected as follows: the optical fibers are inserted into an opening of a component called a ferrule included in an array connector, and are then fixed to the component, whereby the optical axes thereof are aligned with each other and the optical paths are arranged and maintained to be straight. In general, a fiber array is connected to an array connector as follows.

1) The sheath provided over the fiber array is removed and a portion, e.g., glass cores, of the fiber array thus exposed is cut so as to have an appropriate length. The fiber has the glass core, and the core is coated by the cover. The glass core includes a clad and a core. Hereinafter, the glass core is called a core.

2) The exposed portion of the fiber array is inserted into the opening of the ferrule and is fixed to the ferrule with adhesive.

3) The end of the fiber array projecting from an end face of the ferrule is ground and is thus aligned with the end face of the ferrule.

In a case of a fiber sheet that includes many optical-fiber transmission lines, a plurality of array connectors may be used. To perform the above grinding and alignment of fiber ends simultaneously or individually on different array connectors, optical fibers having excessive lengths need to be appropriately processed. This problematically reduces the working efficiency.

To solve such a problem, there has already been proposed an optical connector, i.e., an array connector, (see Japanese Unexamined Patent Application Publication No. 2006-145787, for example) that includes two separable portions: a portion (rear block) into which optical fibers are to be inserted, and a portion (front block) for making optical connection. In this case, the grinding and alignment of fiber ends only needs to be performed on the front block separated from the rear block, and variations in the lengths of the optical fibers projecting from the rear block are absorbed by a refractive-index-matching film interposed between the front block and the rear block.

The refractive-index-matching film is, for example, a transparent, elastic, gel-type film. The optical fibers projecting from the contact surface of the rear block are embedded into the refractive-index-matching film while elastically deforming the film, whereby the projecting portions of the optical fibers are absorbed. Hence, there is no need to grind the ends of the optical fibers projecting from the rear block, and the grinding and alignment of fiber ends is performed only on the front block. In the grinding and alignment of fiber ends performed on the front block, there is no need to process optical fibers having excessive lengths, and the working efficiency is improved. Instead, however, the grinding needs to be performed on both sides of the front block. This leads to another problem of an increase in the assembling cost.

To solve such a problem, there has already been proposed a technique (see Japanese Unexamined Patent Application Publication No. 2001-215364, for example) in which fibers of a fiber array are held by a holding member and the ends of the fibers having various lengths are pressed against a collimating optical system whose entrance surface is fixed, so that no gaps are provided between the optical system and the fibers. In this case, the fibers are slightly bent when the ends thereof are pressed against the collimating optical system. Thus, the variations in the lengths of the fibers (variations in the positions of the ends of the fibers) are absorbed.

The range of variations in the projecting lengths of optical fibers that can be absorbed by interposing a refractive-index-matching film between the front block and the rear block as described above is several microns at most. If the fibers attached to the rear block project by different lengths varying over a range larger than several microns, such variations cannot be absorbed by the refractive-index-matching film. In some cases, the range of variations in the projecting lengths of optical fibers is larger than several microns, and the variations cannot be completely absorbed with the refractive-index-matching film alone. Accordingly, the grinding and alignment of fiber ends may be necessary for the rear block in some cases.

The range of variations in the projecting lengths of optical fibers that can be absorbed by bends in the optical fibers that are pressed against the collimating optical system as described above is also several microns at most, and the variations cannot completely be absorbed by this method, either. That is, the grinding and alignment of fiber ends may be necessary in some cases.

SUMMARY

According to an aspect of the disclosed embodiments, an optical connector includes a fiber-support block configured to couple cores of a plurality of optical fibers, and a lens-support block including a contact surface provided with a plurality of openings, the contact surface contacted to a contact surface of the fiber-support block, the cores of the optical fibers projecting from the contact surface of the fiber-support block insertable into the respective openings, the lens-support block having pairs of collimate lenses and convex lenses in the respective openings, each of the collimate lenses and a corresponding one of the convex lenses being spaced apart from each other in an optical-axis direction, the collimate lenses being movable in the optical-axis direction and being pressed by elastically deformable members, respectively, in the optical-axis direction and toward the contact surface of the fiber-support block.

The object and advantages of the disclosed embodiments will be realized and attained by means of the elements and combinations particularly pointed out in the claims.

It is to be understood that both the foregoing general description and the following detailed description are exemplary and explanatory and are not restrictive of the disclosed embodiments, as claimed.

BRIEF DESCRIPTION OF DRAWINGS

FIG. 4A shows a state of lens systems provided in the collimator in the process of connecting the collimator to a fiber supporter;

FIG. 4B shows another state of the lens systems provided in the collimator in the process of connecting the collimator to the fiber supporter;

DESCRIPTION OF EMBODIMENTS

Embodiments will now be described with reference to the accompanying drawings.

Figure 1:
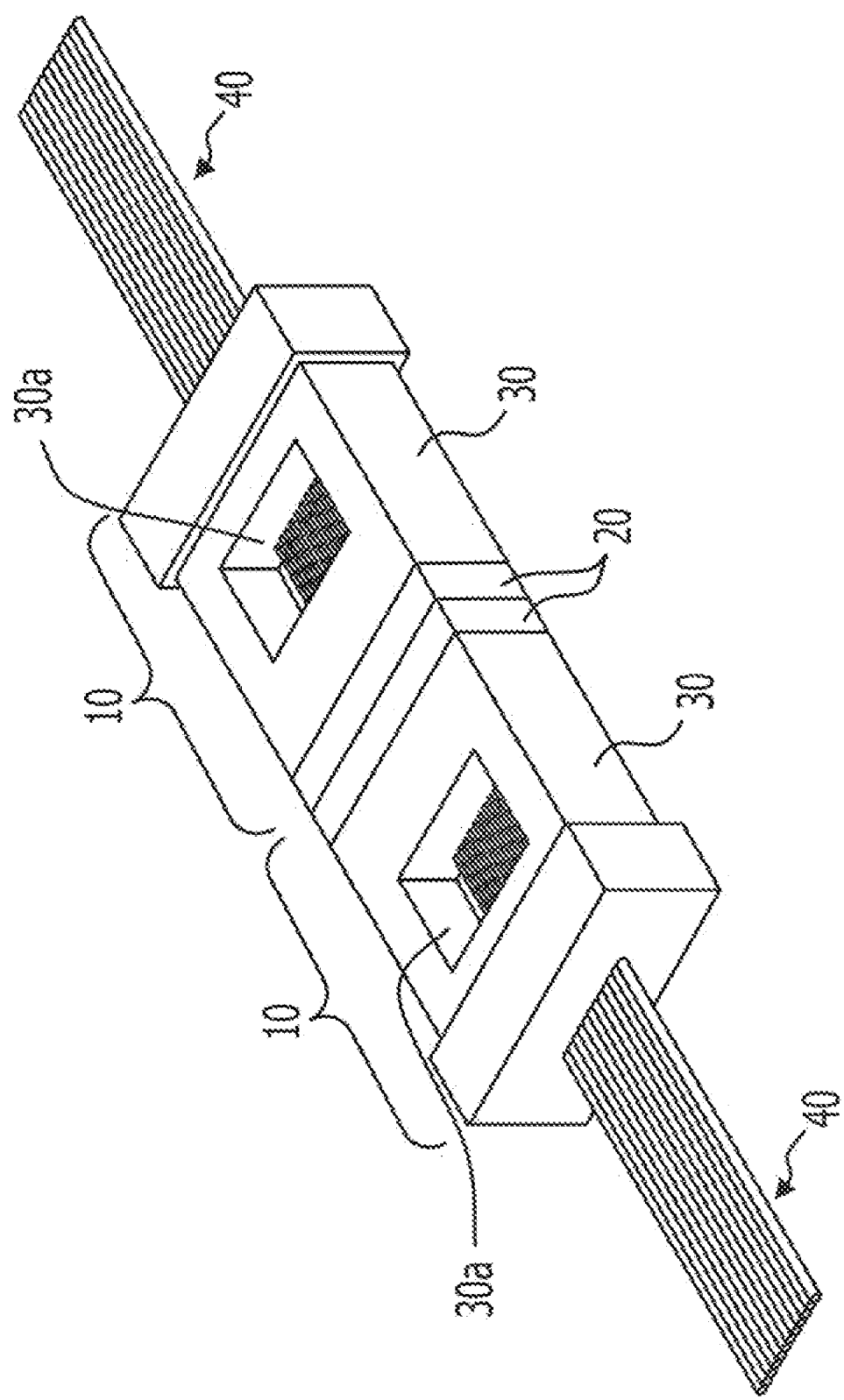
FIG. 1 is a perspective view illustrating an optical connector according to an embodiment.

FIG. 1 is a perspective view illustrating an optical connector according to an embodiment. In FIG. 1, optical connectors 10 having the same shape are connected to each other face to face. The optical connectors 10 each include a collimator 20 and a fiber supporter 30. A fiber array 40 is connected to the fiber supporter 30. The fiber array 40 is a group of optical fibers that are orderly arranged. The collimator 20 has thereinside collimate lenses that collimate light emitted from the optical fibers into parallel rays, as described separately below.

In FIG. 1, different fiber arrays 40 are connected to the optical connector 10 shown on the right and the optical connector 10 shown on the left, respectively. The contact surfaces (front faces) of the optical connectors 10 are made to face each other and are connected to each other with adhesive for optical connection or the like. Thus, the optical fibers of the fiber array 40 shown on the right and the optical fibers of the fiber array 40 shown on the left in FIG. 1 are coupled and/or optically connected to each other.

The fiber supporter 30 has an opening 30a into which adhesive for fixing the fiber array 40 inserted into the fiber supporter 30 is provided. Although fiber cores of the fiber array 40 shown in FIG. 1 are exposed through the opening 30a, the fiber cores are actually not exposed, and only the adhesive provided thereover may be visible in the opening 30a.

Figure 2:
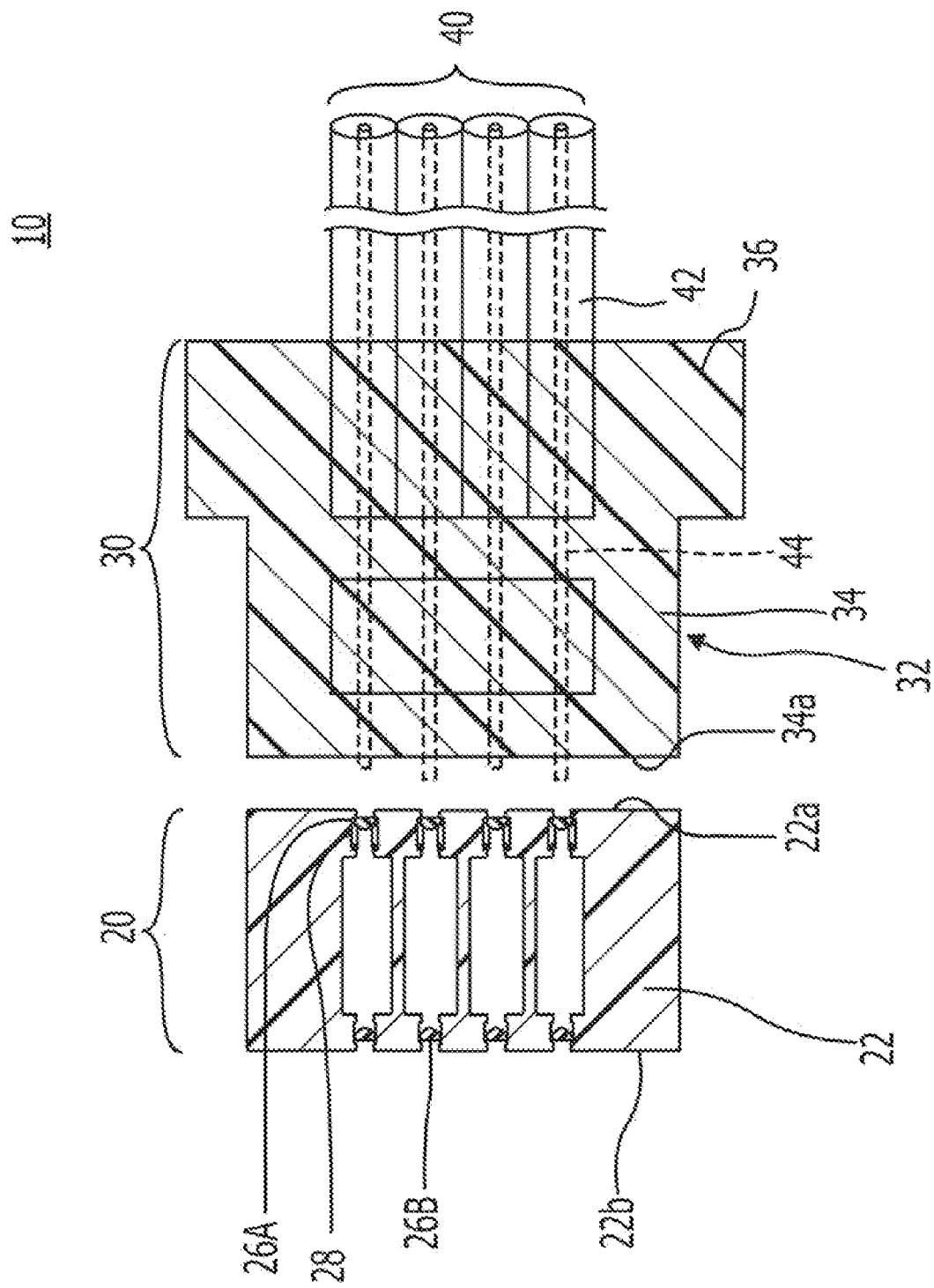
FIG. 2 is a horizontal sectional view illustrating a process of connecting a fiber array to the optical connector.

FIG. 2 is a horizontal sectional view illustrating a process of connecting the fiber array 40 to the optical connector 10. As shown in FIG. 2, the optical connector 10 includes the collimator 20, having lens optical systems therein, and the fiber supporter 30, supporting the fiber array 40, that are connected to each other. FIG. 2 shows a state before the collimator 20 and the fiber supporter 30 are connected to each other. By connecting the collimator 20 and the fiber supporter 30 to each other with, for example, adhesive as described separately below, the optical connector 10 is obtained.

The fiber supporter 30 will first be described. The fiber supporter 30 includes a fiber-support block 32 made of, for example, resin. The fiber-support block 32 has an opening into which the fiber array 40 is to be inserted. More specifically, the fiber-support block 32 includes a core-supporting portion 34 and an array-supporting portion 36. The core-supporting portion 34 has a plurality of through-holes that receive fiber cores 44. The array-supporting portion 36 has one opening that receives the fiber array 40 having fiber sheaths 42.

To connect the fiber array 40 to the fiber-support block 32, the fiber sheaths 42 at an end of the fiber array 40 are removed by a specific length, whereby the fiber cores 44 are exposed. The fiber cores 44 exposed without the fiber sheaths 42 are inserted into the opening of the array-supporting portion 36 toward the core-supporting portion 34. Since the through-holes of the core-supporting portion 34 are orderly provided at the same intervals as the fiber cores 44, the fiber cores 44 are introduced into the respective through-holes. As the fiber cores 44 advance into the through-holes, the fiber sheaths 42 go into the opening of the array-supporting portion 36. As the fiber cores 44 having the fiber sheaths 42 further advance, the ends of the fiber sheaths 42 come into contact with the bottom of the opening of the array-supporting portion 36, and are prevented from advancing any further. This state is shown in FIG. 2, in which the fiber cores 44 slightly project from an end face 34a of the core-supporting portion 34. The end face 34a forms the contact surface of the fiber supporter 30.

The core-supporting portion 34 has the opening 30a (see FIG. 1) as shown by the alternate long and short dashed line in FIG. 2. Adhesive is provided into the opening 30a and is hardened, whereby the fiber cores 44 are fixed to the core-supporting portion 34. Through the process described above, the fiber array 40 is connected to the fiber supporter 30.

In the state where the fiber array 40 is connected to the fiber supporter 30 as described above, the fiber cores 44 slightly project from the end face 34a of the core-supporting portion 34 by different lengths. In the known art, the ends of the fiber cores 44 are ground and thus aligned so that the projecting lengths of the fiber cores 44 become uniform, or the ends of the fiber cores 44 are pressed against a transparent elastic member so that variations in the projecting lengths of the fiber cores 44 are absorbed. In the present embodiment, the collimator 20 described below is attached to the fiber supporter 30. Thus, even if there are significant variations in the projecting lengths of the fiber cores 44, such variations are absorbed.

Figure 3:
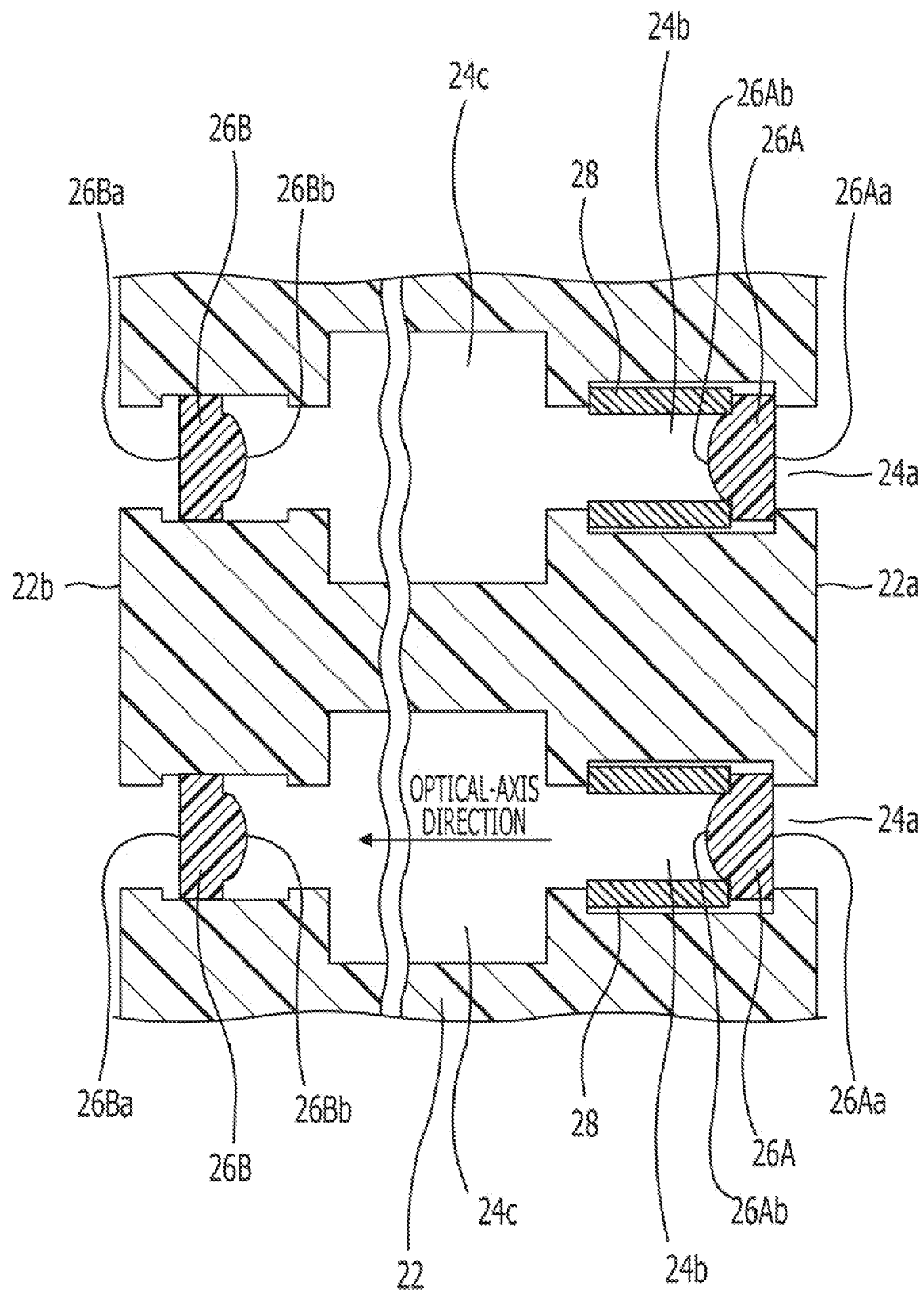
FIG. 3 is an enlarged horizontal sectional view illustrating a part of a collimator.

The collimator 20 will now be described with reference to FIG. 3 as well. FIG. 3 is an enlarged horizontal sectional view illustrating a part of the collimator 20.

The collimator 20 includes a lens-support block 22 and lens optical systems provided in the lens-support block 22. An end face 22a of the lens-support block 22 forms the contact surface of the collimator 20 that is to be connected to the end face 34a of the fiber-support block 32. The lens-support block 22 has another contact surface 22b on the opposite side of the end face 22a. The contact surface of another optical connector is to be contacted to the contact surface 22b (see FIG. 1).

The lens-support block 22 has a plurality of through-holes 24 extending therethrough in correspondence with the fiber cores 44 supported by the fiber-support block 32. In the state where the lens-support block 22 is connected to the fiber-support block 32, the center lines of the through-holes 24 coincide with the center lines (optical axes) of the respective fiber cores 44.

Since the through-holes 24 all have the same configuration, the description will proceed focusing on one of the through-holes 24.

The through-hole 24 includes an end portion 24a defined on the side of the end face 22a of the lens-support block 22. A corresponding one of the fiber cores 44 is to be inserted into the end portion 24*a*. The end portion 24*a* has a slightly larger inside diameter than the outside diameter of the fiber core 44. When the end face 22*a* of the lens-support block 22 is connected to the end face 34*a* of the fiber-support block 32, a portion of the fiber core 44 projecting from the end face 34*a* is inserted into the end portion 24*a* of the through-hole 24.

A portion of the through-hole 24 defined at a deeper position than the end portion 24*a* has a larger inside diameter than the end portion 24*a* and provides a lens space 24*b* in which a lens is housed. A collimating lens 26A and an elastically deformable member 28 are provided in the lens space 24*b*.

The collimating lens 26A is a convex lens having a flat surface 26Aa and a convex surface 26Ab. When diffused light enters the collimating lens 26A from the flat surface 26Aa, the light is collimated into parallel rays by the collimating lens 26A, and the parallel rays are emitted from the convex surface 26Ab.

The elastically deformable member 28 is a hollow elastic body made of rubber, plastic, or the like, or an elastic body such as a metal coil spring. The elastically deformable member 28 is provided in the lens space 24*b* in such a manner as to press the peripheral portion of the convex surface 26Ab of the collimating lens 26A. When the collimating lens 26A is free from any pushing force, the collimating lens 26A is pressed toward the end portion 24*a* under the elastic force exerted by the elastically deformable member 28. When any pushing force is exerted on the flat surface 26Aa of the collimating lens 26A, the elastically deformable member 28 deforms by being compressed in the optical-axis direction, and the collimating lens 26A is moved away from the end portion 24*a*. Specifically, when the flat surface 26Aa of the collimating lens 26A is pushed by the end of the fiber core 44, the elastically deformable member 28 deforms by being compressed, and the collimating lens 26A is correspondingly moved away from the end portion 24*a* along the optical axis in the lens space 24*b*.

A portion of the through-hole 24 defined at a deeper position than the lens space 24*b* provides a hollow 24*c* allowing the parallel rays emitted from the collimating lens 26A to pass therethrough without being blocked. Although the hollow 24*c* shown in FIG. 3 has a larger inside diameter than the other portions, the hollow 24*c* does not necessarily have such a large inside diameter. It is sufficient that the hollow 24*c* has such an inside diameter as to allow the parallel rays emitted from the collimating lens 26A to pass therethrough without being blocked.

A convex lens 26B is fixed in a portion of the through-hole 24 defined at a deeper position than the hollow 24*c*, that is, in a portion on the side of the contact surface 22*b* of the lens-support block 22. The convex lens 26B has a flat surface 26Ba and a convex surface 26Bb, and makes the parallel rays that enter the convex surface 26Bb thereof converge on a specific point (focal point). The convex lens 26B is fixed at such a position that the focal point is defined on the contact surface 22*b* of the lens-support block 22. The convex lens 26B may have the same shape as the collimating lens 26A but be oriented the opposite way to the collimating lens 26A.

By combining the collimator 20 configured as described above and the fiber supporter 30 described further above, the optical connector 10 to which the fiber array 40 is connected is obtained. FIGS. 4A and 4B show states, respectively, of the lens optical systems provided in the collimator 20 in the process of connecting the collimator 20 to the fiber supporter 30.

Before the collimator 20 is connected to the fiber supporter 30, the collimate lenses 26A are stationary by being pressed toward the end face 22*a* by the respective elastically deformable members 28 as shown in FIG. 4A. In this state, the fiber cores 44 project by different lengths from the end face 34*a* of the fiber-support block 32 of the fiber supporter 30 as shown in FIG. 4A.

When the end face 22*a* of the lens-support block 22 of the collimator 20 is brought into contact with the end face 34*a* of the fiber-support block 32 of the fiber supporter 30 as shown in FIG. 4B, the projecting ends of the fiber cores 44 go into the respective end portions 24*a* of the through-holes 24 of the lens-support block 22, and end faces 44*a* of the fiber cores 44 come into contact with the respective flat surfaces 26Aa of the collimate lenses 26A provided in the through-holes 24.

When a fiber core 44 projects by a short length as shown by the upper portion of FIG. 4B, a corresponding one of the collimate lenses 26A pushed by the end face 44*a* of that fiber core 44 is stopped after being moved a relatively small distance. Since the collimating lens 26A is moved while compressing a corresponding one of the elastically deformable members 28, the collimating lens 26A becomes stationary while being held between the end face 44*a* of the fiber core 44 and the elastically deformable member 28. In contrast, when a fiber core 44 projects by a relatively long length as shown by the lower side of FIG. 4B, a corresponding one of the collimate lenses 26A pushed by the end face 44*a* of that fiber core 44 is stopped after being moved a larger amount. Since the collimating lens 26A is moved while compressing a corresponding one of the elastically deformable members 28, the collimating lens 26A becomes stationary while being held between the end face 44*a* of the fiber core 44 and the elastically deformable member 28.

As described above, each of the collimate lenses 26A is pressed in the optical-axis direction by a corresponding one of the elastically deformable members 28. When the collimating lens 26A is pushed by the end face 44*a* of a corresponding one of the fiber cores 44, the collimating lens 26A is moved in the optical-axis direction against the pressing force exerted by the elastically deformable member 28. That is, the collimating lens 26A is movable in the optical-axis direction while being pressed by the elastically deformable member 28. Therefore, when the projecting length of the fiber core 44 is short, the collimating lens 26A is stopped after being moved slightly, and when the projecting length of the fiber core 44 is long, the collimating lens 26A is stopped after being moved more significantly. Since the collimating lens 26A collimates incoming light and emits the light in the form of parallel rays, rays that enter the convex lens 26B provided on the opposite side of the collimating lens 26A are parallel, regardless of where on the optical axis the collimating lens 26A is stopped. Moreover, the parallel rays that enter the convex lens 26B converge on a point in a plane containing the contact surface 22*b*. That is, since the collimate lenses 26A are movable in the optical-axis direction, the end faces 44*a* of the fiber cores 44 are closely in contact with the flat surfaces 26Aa of the respective collimate lenses 26A even if there are variations in the projecting lengths of the fiber cores 44. Moreover, since light emitted from the end faces 44*a* of the fiber cores 44 is collimated and is ultimately focused by the convex lenses 26B, light emitted from the end faces 44*a* of the fiber cores 44 is focused on the same position on the optical axis. Therefore, even if there are variations in the projecting lengths of the fiber cores 44, light emitted from the end faces 44*a* of the fiber cores 44 is focused on a point in the plane containing the contact surface 22*b* of the optical connector 10.

In the present embodiment, the collimate lenses 26A each have the flat surface 26Aa and the convex surface 26Ab, and the end face 44*a* of a corresponding one of the fiber cores 44 is made to be in close contact with the flat surface 26Aa. The collimating lens 26A may alternatively be a combination of an optical component having a flat surface and a convex lens.

The convex lens 26B also has the flat surface 26Ba and the convex surface 26Bb, as does the collimating lens 26A. The convex lens 26B only needs to converge parallel rays. That is, the convex lens 26B does not necessarily have the flat surface 26Ba on one side thereof, and may have curved surfaces on both sides thereof.

The end face 22a of the collimator 20 and the end face 34a of the fiber supporter 30 may be bonded to each other by providing adhesive for optical connection therebetween. Alternatively, the collimator 20 and the fiber supporter 30 may be mechanically connected to each other by cramping. If the collimator 20 and the fiber supporter 30 are bonded to each other with adhesive for optical connection, the adhesive may also be applied to the collimating lens 26A so that the collimating lens 26A is fixed with the adhesive at a position in the lens space 24b of the through-hole 24 where the collimating lens 26A is stopped after being pushed.

To summarize, when a fiber array 40 is connected to the optical connector 10 according to the embodiment, there is no need to grind and align the end faces 44a of the fiber cores 44, and any significant variations in the projecting lengths of the fiber cores 44 are absorbed by the movements of the collimate lenses 26A. Thus, the fiber array 40 is easily connected to the optical connector 10, improving the working efficiency in making a fiber-array connection and reducing the cost of connecting work.

Figure 5:
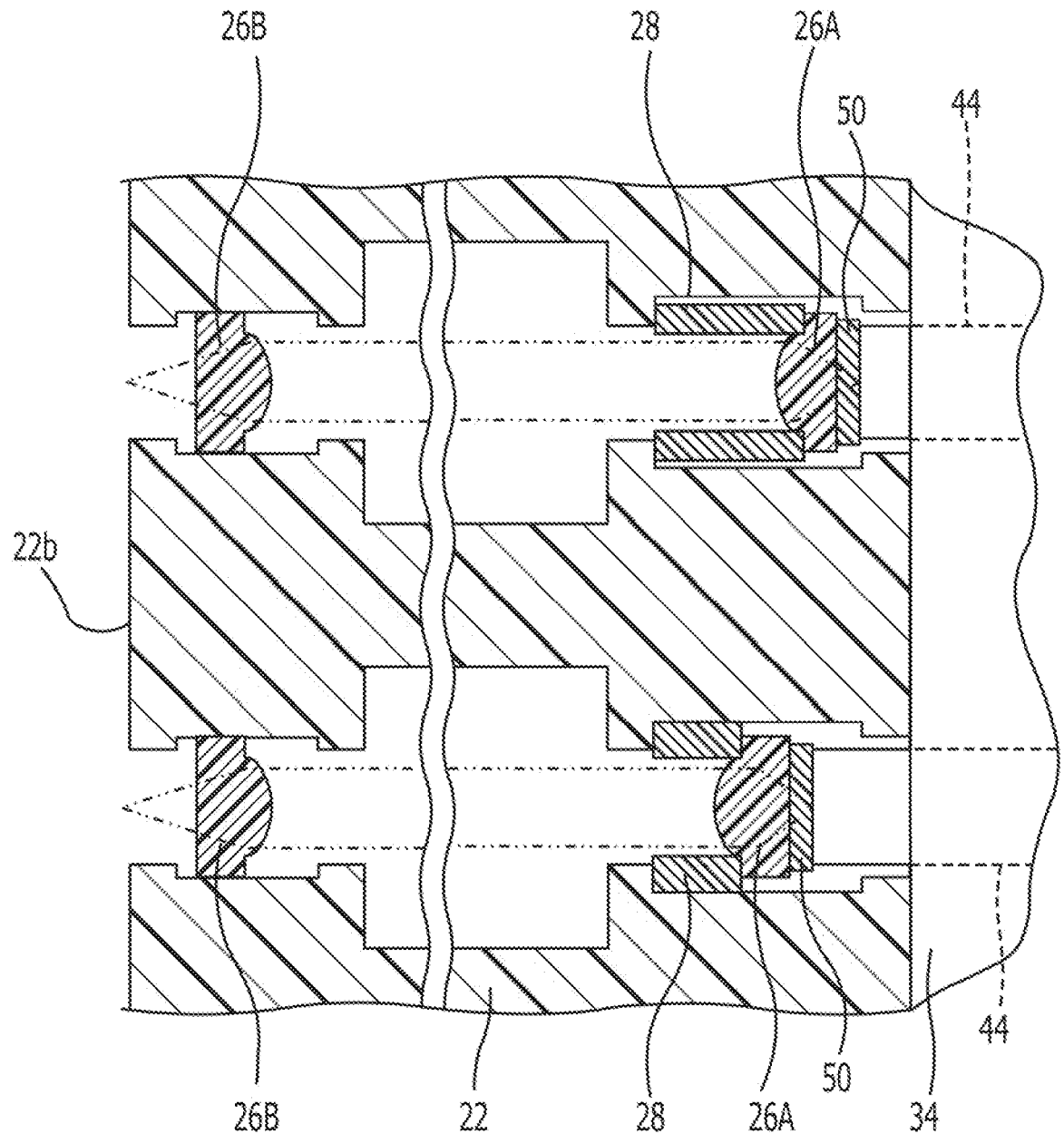
FIG. 5 is an enlarged horizontal sectional view illustrating a part of the collimator to which refractive-index-matching members are added.

In the above embodiment, to match the refractive indices of the collimate lenses 26A and the refractive indices of the fiber cores 44 by enhancing the closeness therebetween, refractive-index-matching members 50 may be interposed between the flat surfaces 26Aa of the collimate lenses 26A and the end faces 44a of the fiber cores 44 as shown in FIG. 5. The refractive-index-matching members 50 are viscous, transparent, gel-type film, for example, and may be pasted to the flat surfaces 26Aa of the respective collimate lenses 26A in advance.

Figure 6A:
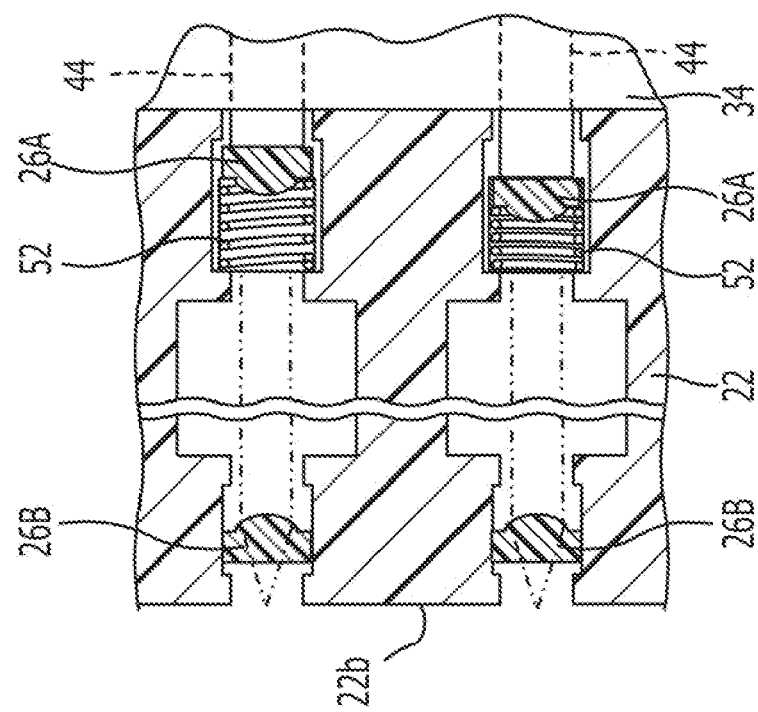
FIG. 6A shows a state of the lens systems provided in the collimator including coil springs as elastically deformable members in the process of connecting the collimator to the fiber supporter.
Figure 6B:
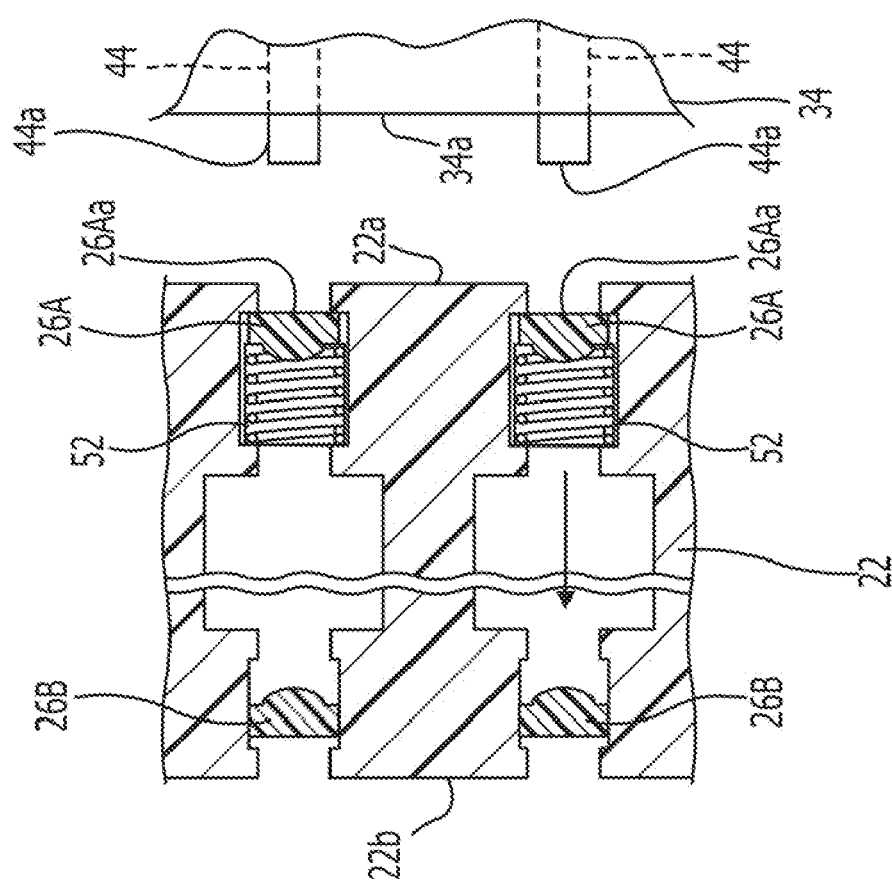
FIG. 6B shows another state of the lens systems provided in the collimator including the coil springs as elastically deformable members in the process of connecting the collimator to the fiber supporter.

While the elastically deformable members 28 are hollow cylindrical elastic members in the above embodiment, the elastically deformable members 28 may alternatively be spiral coil springs 52 as shown in FIGS. 6A and 6B, for example. The coil springs 52 may be made of metal wires, but are not limited thereto.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. An optical connector comprising:
   a fiber-support block configured to couple cores of a plurality of optical fibers; and
   a lens-support block including a contact surface provided with a plurality of openings, the contact surface contacted to a contact surface of the fiber-support block, the cores of the optical fibers projecting from the contact surface of the fiber-support block insertable into the respective openings,
   the lens-support block having pairs of collimate lenses and convex lenses in the respective openings, each of the collimate lenses and a corresponding one of the convex lenses being spaced apart from each other in an optical-axis direction, the collimate lenses being movable in the optical-axis direction and being pressed by elastically deformable members, respectively, in the optical-axis direction and toward the contact surface of the fiber-support block.

2. The optical connector according to claim 1, wherein the collimate lenses have flat surfaces on one sides thereof and convex surfaces on the opposite sides thereof, and are positioned in the respective openings with the flat surfaces thereof facing the contact surface of the fiber-support block.

3. The optical connector according to claim 2, further comprising:
   refractive-index-matching members provided on the flat surfaces of the respective collimate lenses.

4. The optical connector according to claim 1, wherein the elastically deformable members are hollow elastic members.

5. The optical connector according to claim 4, wherein the hollow elastic members are cylindrical.

6. The optical connector according to claim 1, wherein the elastically deformable members are coil springs.

7. A method of connecting a fiber array to an optical connector, comprising:
   exposing a plurality of fiber cores by removing a sheath of the fiber array by a specific length;
   fixing the exposed fiber cores to a fiber-support block such that ends of the exposed fiber cores project from a contact surface of the fiber-support block;
   inserting the projecting ends of the fiber cores into openings, respectively, provided in a contact surface of a lens-support block;
   pushing, with the ends of the fiber cores, collimate lenses provided in the respective openings deeper into the openings; and
   connecting the contact surface of the lens-support block and the contact surface of the fiber-support block to each other by bringing the contact surfaces into contact with each other.

8. The method of connecting a fiber array according to claim 7,
   wherein the collimate lenses are pressed in an optical-axis direction by elastically deformable members, respectively, and
   wherein, when the collimate lenses are pushed with the ends of the fiber cores, the collimate lenses are moved in the optical-axis direction against pressing forces exerted by the elastically deformable members.

9. The method of connecting a fiber array according to claim 7,
   wherein the contact surface of the lens-support block and the contact surface of the fiber-support block are connected to each other with adhesive, and
   wherein the adhesive is also applied to the collimate lenses, whereby the collimate lenses are fixed in the respective openings.

* * * * *